No. 738,012. PATENTED SEPT. 1, 1903.
J. M. DODGE.
TOOTH FOR SPROCKET WHEELS OR GEARS.
APPLICATION FILED FEB. 21, 1903.
NO MODEL. 2 SHEETS—SHEET 1.
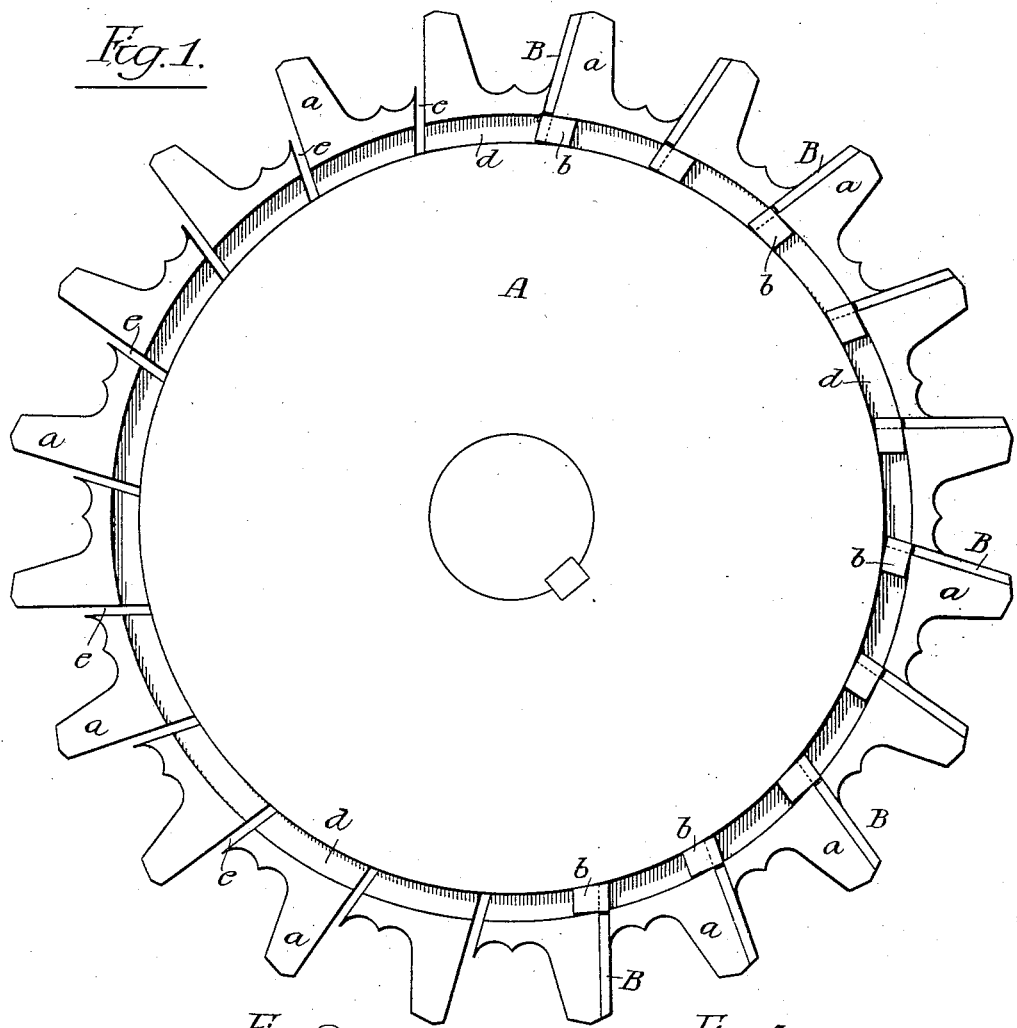
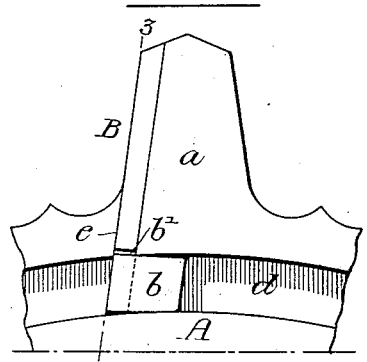
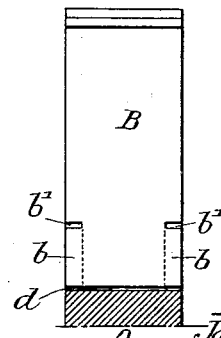
Witnesses:
Augustus B. Copper
Titus H. Ious.
Inventor:
James M. Dodge,
by his Attorneys;
Howson & Howson No. 738,012. PATENTED SEPT. 1, 1903.
J. M. DODGE.
TOOTH FOR SPROCKET WHEELS OR GEARS.
APPLICATION FILED FEB. 21, 1903.
NO MODEL. 2 SHEETS—SHEET 2.
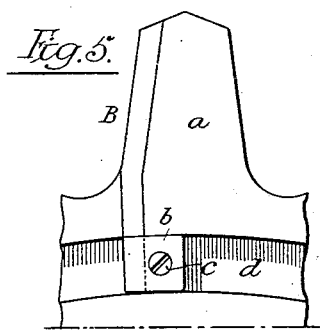
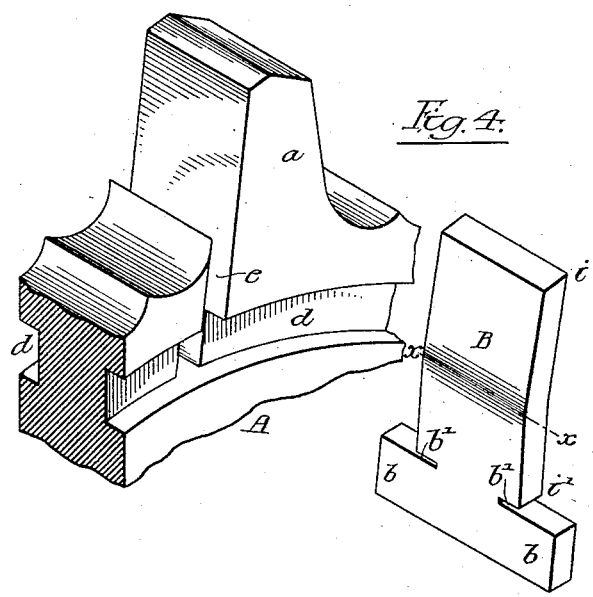
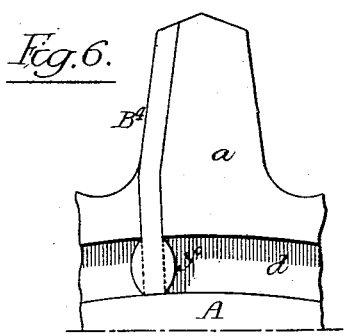
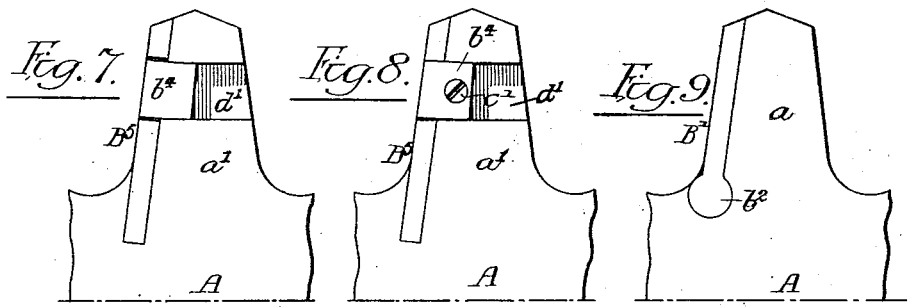
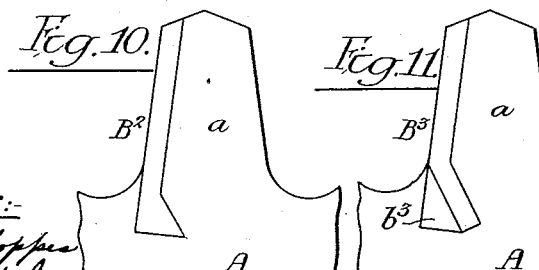
Witnesses:
Augustus B. Coppes
Titus H. Ions
Inventor:
James M. Dodge,
by his Attorneys,
Howson & Howson No. 738,012. Patented September 1, 1903.

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

TEETH FOR SPROCKET WHEELS OR GEARS.

SPECIFICATION forming part of Letters Patent No. 738,012, dated September 1, 1903.

Application filed February 21, 1903. Serial No. 144,491. (No model.)

*To all whom it may concern:*

Be it known that I, JAMES M. DODGE, a citizen of the United States, residing in Philadelphia, Pennsylvania, have invented certain Improvements in Teeth for Sprocket Wheels or Gears, of which the following is a specification.

The main object of my invention is to face the teeth of sprocket wheels or gears with a metal harder than that of the body of the wheel; and a further object of my invention is to make said face detachable, so that it can be renewed.

My invention is especially applicable to the teeth of sprocket-wheels used in connection with drive-chains in which the wear is excessive at one point.

In the accompanying drawings, Figure 1 is a side view of a sprocket-wheel, illustrating my invention, the hard-metal faces being inserted in one-half of the wheel. Fig. 2 is an enlarged view showing one of the teeth illustrated in Fig. 1. Fig. 3 is a sectional view on the line 3 3, Fig. 2. Fig. 4 is a perspective view showing one tooth and the hard-metal facing detached. Figs. 5, 6, 7, and 8 are views of modifications of my invention; and Figs. 9, 10, and 11 are views of further modifications of my invention.

A is a sprocket-wheel, in the present instance having a series of teeth $a$ of the required shape to properly engage a drive-chain.

B is the facing of hard metal, such as steel, which is secured in position on the driving-face of the tooth.

I secure the facing B to the wheel in the following manner: I cut or form in each side of the wheel annular grooves $d\ d$ and then cut away the face of the tooth and slot the body of the wheel at $e$, the slot being of a width equal to the thickness of the facing B. The facing is shaped as shown in Fig. 4, having wings $b\ b$ and preferably slotted at $b'$, and the body of the facing is preferably bent on the line $x\ x$, so that it will be slightly bowed, as shown in Fig. 4. The facing is then applied to the wheel by driving it into the slot $e$, and as it is driven in the two edges $i\ i'$ of the facing will bear upon the tooth, owing to the bowing of the facing, and as the facing is driven into the slot it will straighten and will have a rigid bearing against the face of the tooth.

When the facing is driven into position, the wings $b\ b$ will be in line with the annular grooves $d$ in the wheel, and then they can be hammered down into the grooves, as shown in Figs. 1 and 2, the metal at the wings being soft, the slots $b'$ allowing the wings to be bent so as to be flush with the body of the wheel. When the facings have become worn, they may be readily removed by simply prying up the wings and forcing the facing out of the groove $e$.

In some instances a single groove $d$ may be cut in one side only of the wheel, and a screw or pin $c$ may be driven through an opening in the wing and into the body of the wheel, as shown in Fig. 5, to hold the facing against lateral movement, or the portions of the facing $B^4$ extending into the grooves $d\ d$ may be hammered down, as shown at $y$, Fig. 6, so as to provide an enlargment which will prevent the accidental withdrawal of the facing, or a groove $d'$ may be cut in one or both sides of the tooth $a'$, as shown in Fig. 7, and a wing $b^4$, projecting from the facing $B^5$, may be turned into this groove, and this wing may be secured by a pin or screw $c'$, as shown in Fig. 8.

While I prefer to slightly bow the facing in order to make a tight fit against the tooth, this may be dispensed with in some instances.

In Fig. 9 I have shown the slot in the wheel formed by drilling a hole laterally through the wheel at the base of the tooth, and in this instance the facing B' has a cylindrical enlargement $b^2$, which snugly fits the circular slot, and the facing is driven into the slot from one side.

In Fig. 10 I have shown the slot undercut and a facing $B^2$ shaped to fit the undercut opening.

In Fig. 11 I have shown the facing of an even thickness throughout and bent to fit the undercut slot, and a wedge $b^3$ is provided which is driven in from the side to secure the facing in position.

While I have shown the facing on one side of the tooth only, it will be understood that it may be applied to both sides of a tooth without departing from the main feature of my invention. I have simply shown it on one side in the present instance, as sprocket-wheels are usually driven in one direction only, and the facing is applied to the side with which the chain comes in contact.

I claim as my invention—

1. The combination of a wheel having a tooth and slotted in front of the tooth and having a groove in its side communicating with the slot, with a facing bearing against the tooth and entering the slot and projecting into the groove at the side, substantially as described.

2. The combination of a wheel having a tooth and having a slot at the base of the tooth, and a groove in one side, a facing of hard metal extending into the slot and having a wing turned into the groove, substantially as described.

3. The combination of a wheel having a tooth and having a slot parallel with the face of the tooth, with a plate forming the bearing-face, the said plate being slightly bowed so that when it is driven into the slot its upper and lower edges will bear firmly against the tooth, substantially as described.

4. The combination of a wheel having a series of teeth and slotted in front of each tooth and parallel with the face thereof and having an annular groove at each side connecting with the slots, with winged facing-plates driven into the slots and bearing against the face of each tooth, the wings of the plates being bent into the annular grooves, substantially as described.

5. The combination of a wheel having a tooth and having a slot at the base of the tooth and a groove in one side, with a facing extending into the slot and having a wing and slotted above the wing so that when the wing is turned into the groove it will be flush with the side of the wheel, substantially as described.

6. The combination of a wheel having a series of teeth and slotted in front of each tooth and parallel with the face thereof and having an annular groove at each side connecting with the slots, winged facing-plates driven into the slots and bearing against the face of each tooth, the wings of the plates being bent into the annular grooves, with means for fastening the wings to the wheels, substantially as described.

In testimony whereof I have signed my name to this specification in the presence of two subscribing witnesses.

JAMES M. DODGE.

Witnesses:
 WILL. A. BARR,
 JOS. H. KLEIN.